United States Patent [19]

Thornton, Jr. et al.

[11] Patent Number: 5,005,457
[45] Date of Patent: Apr. 9, 1991

[54] METHOD AND APPARATUS FOR WASTE COLLECTION AND STORAGE

[75] Inventors: William E. Thornton, Jr., Friendswood; Whitemore, Henry B., San Antonio, both of Tex.

[73] Assignee: The United States of America as represented by the United States National Aeronautics and Space Administration, Washington, D.C.

[21] Appl. No.: 392,174

[22] Filed: Aug. 10, 1989

Related U.S. Application Data

[62] Division of Ser. No. 35,401, Apr. 7, 1987, Pat. No. 4,870,709.

[51] Int. Cl.⁵ ............................ B26D 1/10; B26D 7/02
[52] U.S. Cl. ................................... 83/206; 83/203; 83/277; 83/282; 83/614; 83/649
[58] Field of Search ............... 83/206, 277, 282, 460, 83/614, 649, 650, 203

[56] References Cited

U.S. PATENT DOCUMENTS 3,701,299 10/1972 Stumpf ............................... 83/277
3,831,472 8/1974 Sasaki ............................... 83/277
4,092,817 6/1978 Rist III ............................... 83/649

*Primary Examiner*—Hien H. Phan
*Attorney, Agent, or Firm*—Edward K. Fein; Harold W. Adams; Russell E. Schlorff

[57] ABSTRACT

A method and apparatus for collection of fecal matter designed to operate efficiently in a zero gravity environment. The system comprises a waste collection area within a body having a seat opening. Low pressure within the waste collection area directs fecal matter away from the user's buttocks and prevents the escape of undesirable gases. The user actuates a piston covered with an absorbent pad that sweeps through the waste collection area to collect fecal matter, scrub the waste collector area, press the waste against an end of the waste collection area and retracts, leaving the used pad. Multiple pads are provided on the piston to accommodate multiple uses of the system. Also a valve allows air to be drawn through the body, which valve will not be plugged with fecal matter. A sheet feeder feeds fresh sheets of absorbent pad to a face of the piston with each actuation.

4 Claims, 7 Drawing Sheets

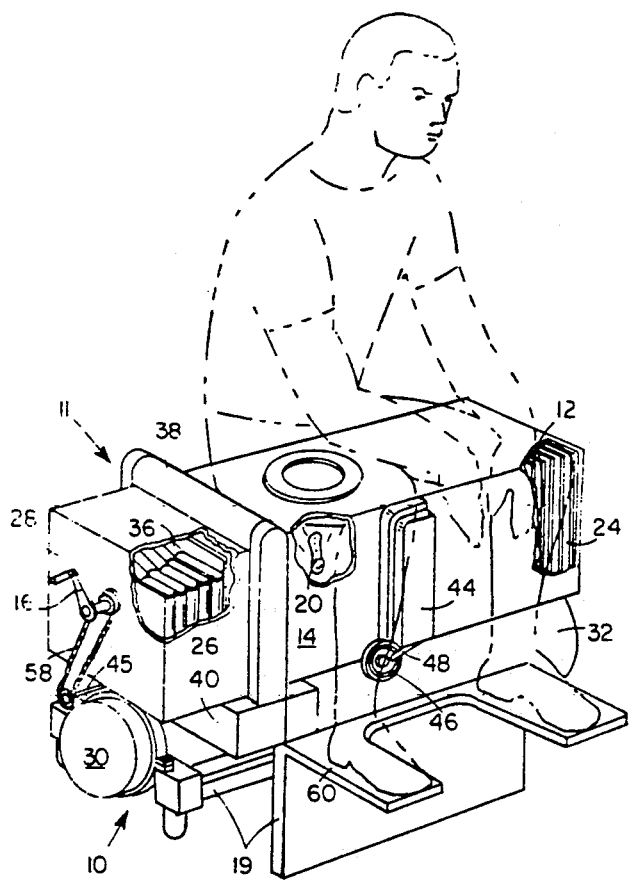
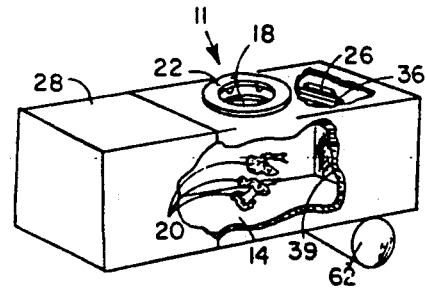
FIG. 2A
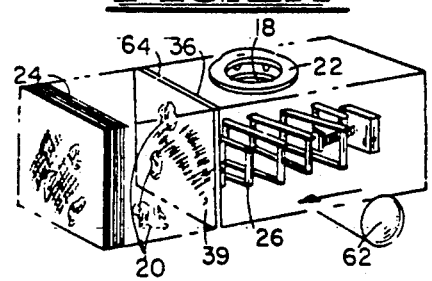
FIG. 2B
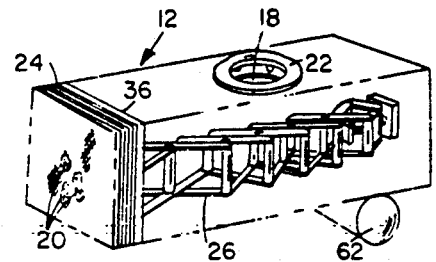
FIG. 2C
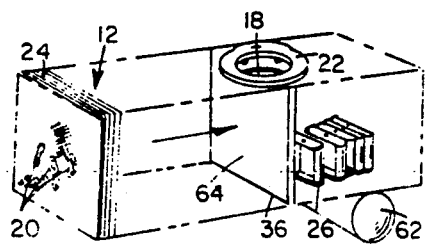
FIG. 2D
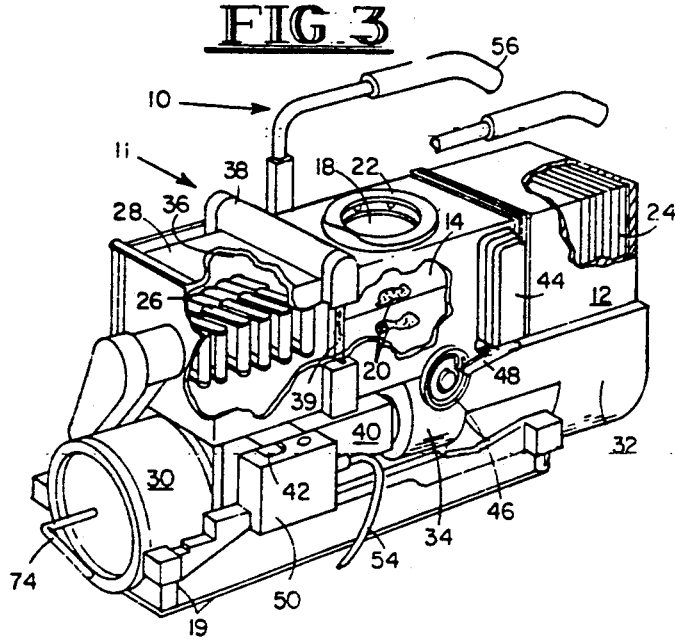

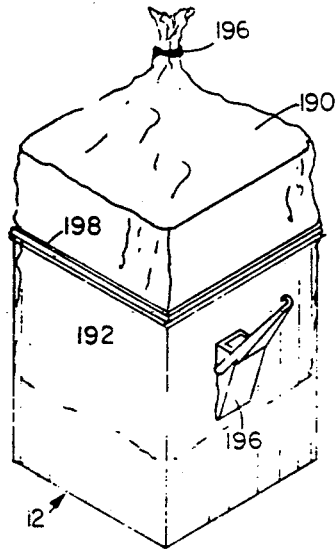 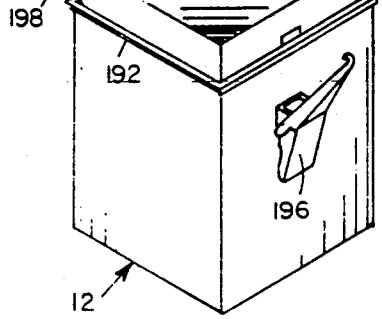 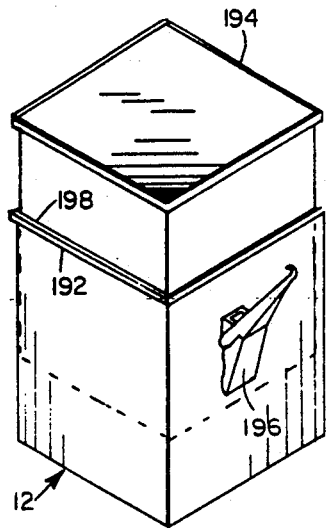
FIG. 9  FIG. 10  FIG. 11
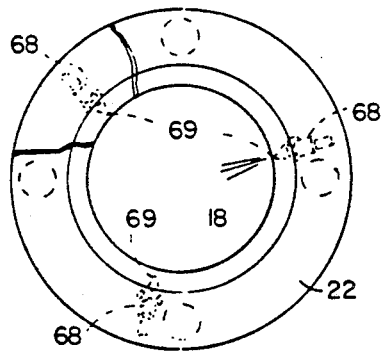
FIG. 12
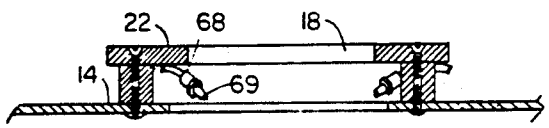
FIG. 13

METHOD AND APPARATUS FOR WASTE COLLECTION AND STORAGE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This is a division of application Ser. No. 07/035,401, filed 04/07/87, now U.S. Pat. No. 4,870,709.

BACKGROUND OF THE INVENTION

1. Field of the Invention

The present invention relates to a human fecal collection system with features which allow it to be used in weightless conditions of space flight.

2. Brief Description of the Prior Art

In the closed and limited volume of current space craft, waste collection, handling, and disposal, further complicated by weightlessness and absence of significant quantities of power and water, is a major health concern. It may also have an emotional impact on the crew, and especially untrained passengers, forced to deal with human waste in a fashion contrary to culture and experience.

The first inflight solid waste collection system was an adhesive rimmed bag stuck on the subject's buttocks with a finger cot molded in for removal of adherent material. Skylab used a seat with an individual, replaceable bag collector, integral filter, and flow through air entrapment system. Individual bags were then vacuum dried and stored for return to earth. Because of the size, complexity and power cost of the Skylab waste collection system, a more efficient system was designed for the space shuttle. This system used a single large pot with a centrifugal macerator/slinger which would plaster the pot walls with successive layers of fecal material, which were subsequently dried by vacuum. There are serious operational difficulties with this system. The personal experience of a co-inventor (an astronaut) of the instant invention during a ground simulation and two space flights with the shuttle waste collection system provided the impetus for the development of the present invention.

A number of patents disclose an array of waste collection devices, many of which are designed for space flight. These patents disclose vacuum and air assist means, bagging means, and sweep means (in the form of bare pistons). However, none of these suggest the concept of a waste collection chamber having a piston acting therein with a replaceable facing material thereon to clean the chamber, compact and separate the materials with each cycling of the piston.

An example of a waste collection system can be found in U.S. Pat. No. 4,281,655 (Trauchi, 1981) which discloses a vacuum suction type urinal designed to conform to body parts. Urine is automatically carried along with air sucked from a urine receiving unit and transmitted to a urinal. Air is supplied to the urine receiving unit through a plurality of small holes. The urine so collected is disposed of by customary means.

An example of a zero gravity toilet with a buttocks-conforming seat is found in U.S. Pat. No. 3,340,544 (Cella, 1967). The seat creates an airtight seal against the subject's buttocks. High pressure fluid is directed through jet means to the subject's anus, thereby washing it clean following use. Positive pressure in the water collection system cavity forces the water down a tube sending it into a low pressure collection receiver. The fluid contains reagents which will form a resin plug in the depending tube. The plug, urged by air pressure, will be forced down the tube and clean the passage as it advances.

U.S. Pat. No. 3,405,409 (Bennett, 1966) discloses a space toilet which includes a vacuum suction means combined with air flow jets located around the periphery of the seat. The vacuum means is used to draw the liquid and solid waste material into a gas permeable collection bag. A second bag encompassing the first is completely impermeable. The first bag is manually sealed by the user within the second bag, and dropped into a continuously heated dessication chamber which is sealed by a piston. The piston is not used to compress, but merely to seal the dessication chamber from the waste collection area, and prevent the escape of odor.

A flush toilet which utilizes positive control over a liquid flushing medium is described in U.S. Pat. No. 3,329,974 (Belasco et al., 1967). A current of air supplied near the seal between the seat and the subject's buttocks, directs both feces and odor to the toilet bowl outlet. A water jet is provided to cleanse the rectal area which is followed by a drying jet of warm air. Water under pressure is used to wash the toilet bowl, and the liquids and feces removed through the bowl outlet are conveyed to a blender. Urine and the feces/water mixture from the mechanical blender are pumped to a vacuum distillation unit. Distilled water from the vacuum distillation unit is then available for future flushing. A continuous low pressure is maintained in the system, preventing the escape of odor into the cabin.

Despite the numerous inventions relating to waste collection and storage, none has yet been developed that efficiently and simply solve the problems encountered in space flight. No previous device has been designed that is compact, simple and efficient, and combines air flow means, piston means, replaceable facing pads, and a storage means.

SUMMARY OF THE INVENTION

Accordingly, it is an object of the present invention to provide a waste collection system utilizing piston collection-compaction to receive and store the products of defecation.

A further object of the invention is to provide an air circulation system to aid the removal of feces from the rectal area of the subject and for odor control.

Another object of the invention is to provide a filter system for removal of liquids and particulate matter from within the waste collection system.

A further object of the invention is to provide for supplying and replacing the face of a piston with facing material which may be impregnated with bacteriostatic or other agents.

Yet another object of the invention is to provide for valves for sealing the waste collection system during the collection-compaction cycle.

A further object of this invention is to provide for mechanical linkage to actuate the piston and valving system in a coordinated manner.

A further object of this invention is to provide a method for the collection, compaction and storage of human fecal matter.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following description of illustrative embodiments when read in conjunction with the accompanying drawings, wherein:

FIG. 1 is a front perspective of the present invention showing a portion of the inner workings thereof.

FIGS. 2A–2D are rear perspectives of the present invention showing the sweeping piston means thereof.

FIG. 3 is a front perspective of an alternative embodiment of the present invention.

FIGS. 9–11 are perspectives of the waste storage module of the present invention.

FIG. 12 is a plan view of the seat of the present invention showing jet nozzles.

FIG. 13 is a cross-section of the seat and jet nozzles of the present invention.

DESCRIPTION OF THE PREFERRED EMBODIMENT

Figure 4:
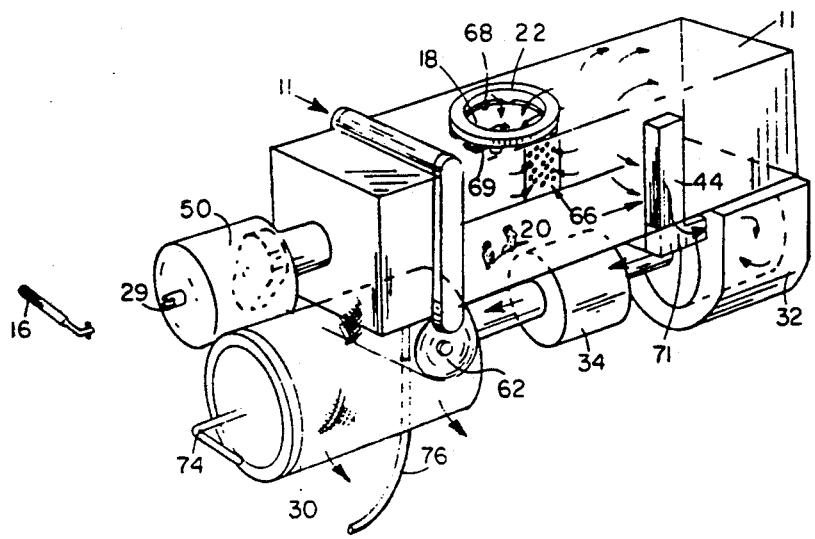
FIG. 4 is a front perspective of the present invention showing the air flow therethrough.

Waste collection system 10 is best viewed for clarity and simplicity as a number of sub-systems interrelated structurally and functionally to provide an efficient means of collection and storage of fecal matter 20.

The sub-systems described in detail in the accompanying figures and in the paragraphs below consist of the following: a means for ventilation designed to prevent odor from emanating from waste collection system 10 and for driving, by use of air currents, fecal matter 20, wipes and cleaning material of the user into waste collection area 14; a sweep and compaction means, either manual or motor driven, that removes fecal matter 20, wipes and cleaning material from waste collection area 14; a waste storage area 12 for retaining collected fecal matter 20, wipes, and cleaning material; a sheet replenishing means working in conjunction with the sweep means and waste storage area 12 and designed to keep the sweep means and waste collection area 14 free and unsoiled by fecal matter 20; and a valve system designed to control removal of air from body 11 during the operation of the sweep means.

FIG. 1 shows the main components and sub-systems of waste collection system 10. Body 11 of waste collection system 10 may be of generally rectangular dimensions but could operate with other geometries. Body 11 encloses therein waste storage area 12, waste collection area 14, and piston storage area 28. Body 11 rests on frame 19. Seat 22 is mounted on body 11 over waste collection area 14 and is preferrably constructed of molded, resilient material that will conform to the human buttocks. Seat 22 encircles seat opening 18 which allows communication between user and waste collection area 14. Thigh restraints 56 are required for weightless environments.

After a user has made deposits of feces, wipes and cleaning material in waste collection area 14, he rotates crank 16 (see FIG. 3) which actuates piston scissors 26. Piston scissors 26 are attached to piston 36 and are designed to extend and retract piston 36 across waste collection area 14. Functionally, scissors 26 are piston 36 actuators. Piston 36, urged by piston scissors 26, moves through waste collection area 14, collecting fecal matter 20, wipes and cleaning material ahead of sheet 39. This action continues until previously compacted feces stored between soiled sheets 24 is encountered. At this point controlled pressure is applied causing fecal matter 20 to spread radially and bonding waste material between previous soiled sheets 24 and current sheets 39. On retraction of piston 36, fecal matter 20 adheres to the previously compacted mass of soiled sheets 24 and sheet 39 facing piston 36, removing sheet 39 from piston 36. Sheet 39 has an impervious layer adjacent piston 36 to prevent soiling by seepage. In this manner, fecal matter 20 is swept from waste collection area 14, compacted and stored in waste storage area 12 under compression by force of piston 36 until next use. This results in minimal possible storage volume.

Prior to defecation, the user switches on ventilation fan switch 42, which starts blower motor 34 and creates a negative pressure within body 11. Air, drawn in through body 11, thereby sweeps fecal matter 20 into waste collection area 14. Air continues out of body 11 through occlusion valve 44. (which is designed to prevent intake of solids from collection area 14. Hydrophobic micron filter 32 prevents any liquid from passing and removes all particles including bacteria from the air. Blower motor 34 draws dry air from hydrophobic filter 32 and expels it into odor filter 30, where disagreeable odors are removed therefrom. A number of substances may be used as a filtering agent for odor filter 30, with activated charcoal being a common substance. Dry, odorless, bacteria and particle free air is then expelled into spacecraft through sides of odor filter 30. Handle 74 assists in removal of odor filter 30.

The rotation of crank 16, which actuates piston 36 in the manner described above, also opens occlusion valve 44, allowing air to flow therethrough. Occlusion valve 44 is actuated by cam 46, through rocker arm 48. In alternate embodiments, occlusion valve 44 may be actuated by a vacuum diaphragm. When blower motor 34 is on and piston 36 is retracted as illustrated in FIG. 1, occlusion valve 44 is open and allows air to exit therethrough. When waste collection system 10 is "flushed," piston 36 crosses seat opening 18 and occlusion valve 44 closes. Continued extension of piston 36 past seat opening 18 will then compress air (since at this point occlusion valve 44 and seat opening 18 are sealed), thereby forcing air around narrow space between piston 36 and body 11. Sheet 39 overlaying edges of piston 36 acts as a swab to clean interior of body 11 as it wraps around piston 36 and contacts body 11.

The sheet feed mechanism 40 is designed to pull sheet 39 from sheet roll 62 across piston 36 when piston scissors 26 place piston 36 in a retracted position as shown in FIG. 2A. While sheet roll 62 is illustrated, accordian folded sheets may also be used. As will be further illustrated in the discussion of FIG. 7 below, sheet feed mechanism 40 will "grab" sheets from sheet roll 62, pull them up across piston 36, then cut off sheet 39. In this manner, piston face 64 will have a clean sheet 39, prior to commencement of each "flush" operation.

FIGS. 2A, 2B, 2C and 2D illustrate in sequential steps the manner in which waste collection system 10 functions. FIG. 2A illustrates the "armed" position of waste collection system 10 just after defecation by the user. FIG. 2B illustrates the "flush" operation. FIG. 2C shows the "stored" configuration (the position of piston 36 when waste collection system 10 is not in use). FIG. 2D shows waste collection system 10 being "rearmed" just prior to defecation by user.

Figure 6:
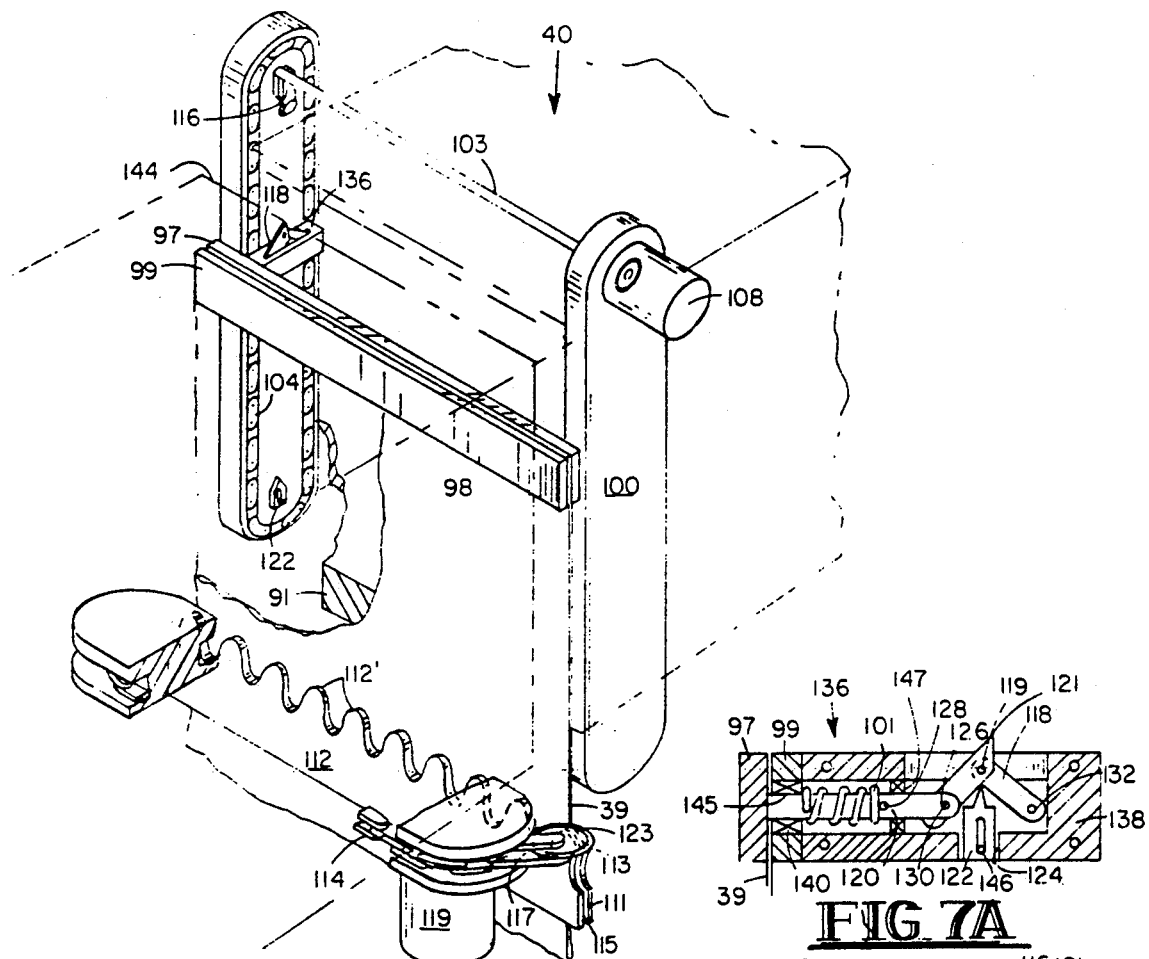
FIG. 6 is a perspective of the sheet feeding assembly of the present invention.

In FIG. 2A piston 36 is in a retracted or "armed" position. Piston face 64 of piston 36 is covered with sheet 39. Piston 36 has been cranked into the position shown in FIG. 2A just prior to use. That is, when user is defecating, piston 36 is "armed" as illustrated in FIG. 2A. In the "armed" position, sheet 39 is stretched across face 64 of piston 36, in a manner fully described in the paragraphs below accompanying FIG. 6. Following deposition of fecal material 20 in waste collection area 14, crank 16 or motor 50 is actuated by user and waste collection system 10 is "flushed." As illustrated in FIG. 2B, this "flushing" moves piston 36 across waste collection area 14 of body 11. FIG. 2B also illustrates waste storage area 12 with several soiled sheets 24 from prior "flushings" compacted therein. FIG. 2C illustrates the waste collection system 10 in its "stored" position. That is, this is the position of piston 36 when waste collection system 10 is not in use. In this configuration, pressure is maintained on soiled sheets 24 by piston 36. FIG. 2D illustrates waste collection system 10 being returned to its "armed" position. Piston 36 is retracted by piston scissors 26 that are actuated by manual crank 16 (see FIG. 3) or motor 50 (see FIG. 1). When waste collection system 10 is returned to a configuration illustrated in FIG. 2A, its use will have resulted in compacting of fecal material 20, wipes and cleaning material in waste storage area 12 between and on soiled sheets 24. In this cyclical fashion fecal matter 20, wipes and cleaning material are swept out of waste collection area 14 and stored in a compressed, compacted manner in waste storage area 12. Upon retraction of piston 36 as illustrated in FIG. 2D, note that soiled sheets 24 with fecal matter 20, wipes and cleaning material contained thereon and therebetween remain in waste storage area 12. Piston 36 returns to its armed position by rotating crank 16 or reversing motor 50. Sheets 39 may be impregnated with bacteriostatic agents to mitigate the bacterial action in the fecal matter 20, and/or deodorizing agents.

FIG. 3 illustrates a different embodiment of waste collection system 10 than is shown in FIG. 1. More particularly, in this embodiment the user sits "side saddle," unlike FIG. 1 wherein the user sits with the user's legs straddling the waste collection system 10. The advantage of the embodiment illustrated in FIG. 3 is that user need not fully remove his pants. In addition, FIG. 3 reveals crank 16 for manual "flushing." FIG. 3 shows ventilation fan switch 42, odor filter 30, and crank 16. Crank 16 is located at the end of body 11 which contains piston 36 and piston scissors 26. Waste storage area 12 is also illustrated. Occlusion valve 44 is shown with pivotally attached rocker arm 48 engaged at one end to cam 46. Cam 46 is in turn driven by a gear box and axle shaft arrangement (not shown) at end of cam drive shaft 45. Rotation of crank 16 rotates cam drive shaft 45 through crank chain 58. A gear box and axle shaft (not shown) gear down the crank rotations appropriately so occlusion valve 44 closes at the appropriate time. This 'timing' between crank 16 and occlusion valve 44 is described in more detail in the paragraphs below accompanying FIG. 5F.

FIG. 4 illustrates with arrows the air flow through waste collection system 10 created by ventilation means. During defecation, fecal matter 20, wipes and cleaning material are deposited in waste collection area 14. Blower motor 34 is actuated by ventilation fan switch 42. Blower motor 34, turned on prior to defecation, creates a lower pressure within body 11 than without. As a result of this pressure differential, air is drawn in through jets 68 or slots (not illustrated) at the base of seat 22 and between any spaces between the buttocks of user and seat 22. Jets 68 are designed to be adjustable. Nozzles 69 may be manually adjusted to control not only the amount of air passing therethrough but also the direction of the air. During use of waste collection system 10, most of the air is drawn in through jets 68 when there is a good seal between the user and seat 22. However, all or some of the air coming through jets 68 can come through slots (not illustrated) along seat 22 perimeter. During defecation, the air so drawn in (see arrows) moves out of body 11 through occlusion valve 44 and into hydrophobic filter 32. In the preferred embodiment, there is an occlusion valve 44 on both sides of body 11. Occlusion valve 44 is designed to prevent solid material such as fecal matter 20 from passing therethrough by utilizing a multiplicity of small plate orifices 66. Air is drawn from occlusion valve 44 through channel 71 into hydrophobic filter 32. Liquid and all particles, including bacteria are removed from the air by hydrophobic filter 32, leaving only dry air. This dry air is drawn through blower motor 34 and directed into odor filter 30. Odor filter 30, made of activated charcoal or other suitable material, removes disagreeable odors from the air. Air is vented to cabin through side of odor filter 30.

FIG. 4 also illustrates vacuum tap 76, which is an air bleed line connected with the outside of the spacecraft (or some other source of negative pressure), thereby creating a slight negative pressure within body 11 even when blower motor 34 is not on. Such a slight negative pressure allows the continual, slight air flow into and through waste collection system 10 and out vacuum tap 76. This removes gases and disagreeable odors from waste collection system 10 when blower motor 34 is not in operation.

FIG. 4 also illustrates motor 50 adapted to drive piston scissors 26 and piston 36 across waste collection area 14. That is, instead of crank 16 manually operating piston 36, motor 50 may be used. The embodiment illustrated in FIG. 4 shows a crank override socket 29 adapted to receive crank 16.

The next series of illustrations, FIGS. 5A-5E, show the sweep/compaction means sub-system. More specifically, these show how piston 36 is coordinated to operate with occlusion valve 44 and seat valve 86 and thereby sweep waste collection area 14 free of fecal matter 20, wipes and cleaning material.

Figure 5A:
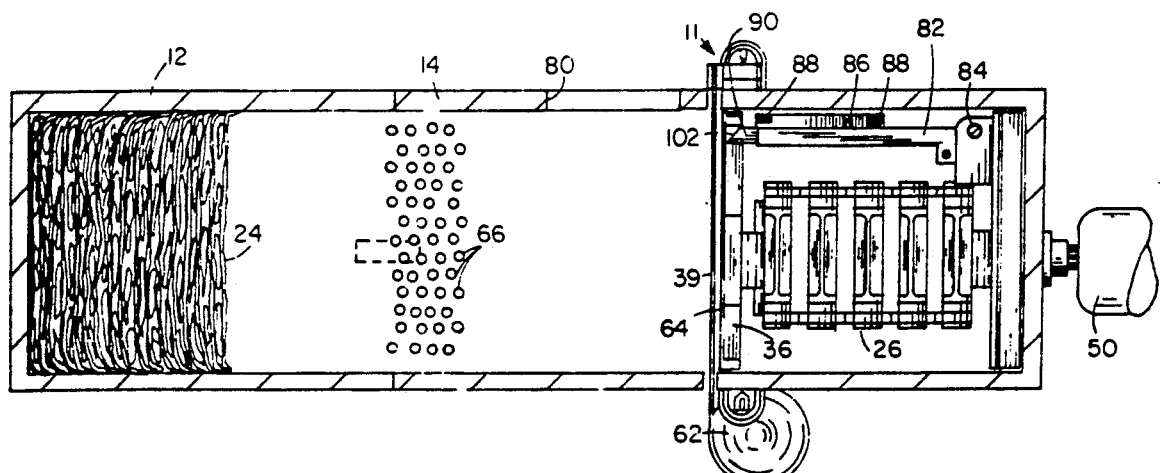
FIGS. 5A–5E are elevated cross-sectional views of the main body of the present invention showing sweeping piston means and seat sealing means.

FIG. 5A is a cross-sectional view of body 11 when "armed." To "arm," user, just prior to defecation, must: (1) retract piston 36 from its "stored" position; (2) activate sheet feed mechanism 40 (explained in more detail accompanying FIGS. 6 and 7 below); and (3) turn on blower motor 34. (It is anticipated these three steps can be automated and activated by a single switch.) When "armed," piston scissors 26 are in a retracted position, with face 64 covered by fresh, clean sheet 39. Occlusion valve 44, with its numerous plate orifices 66, is open into waste collection area 14, to allow the flow of air therethrough and thus out of body 11. This is the position of waste collection system 10 when user is defecating. Blower motor 34 is on and waste collection system 10 "armed." FIG. 5A also shows the positional relationship between seat valve 86, telescoping slide 82, seat valve seals 88, and pivot point 84. Telescoping slide 82 is spring-loaded to urge seat valve 86, which is pivotally attached to telescoping slide 82, outward against piston 36.

Figure 5B:
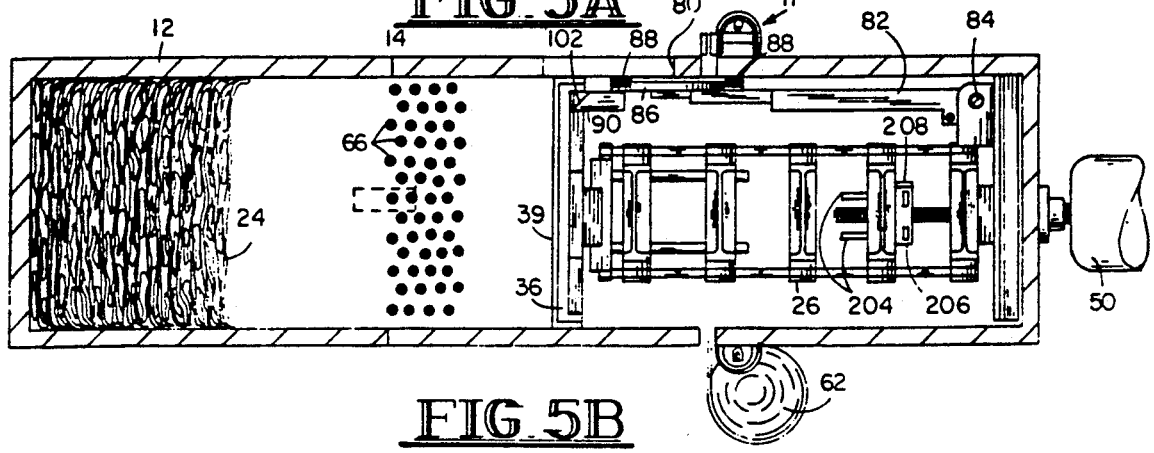

Along a portion of rim of seat valve 86 extends wedge-shaped catch 90. Catch 90 extends from seat valve 86 where seat valve 86 is closest to piston 36. More particularly, catch 90 presses outward against rear of piston 36 under pressure by spring-loaded telescoping slide 82. At the same time, catch 90 is urged upward against lip 102 which is projecting rearward from perimeter of piston 36. This upward urging of seat valve 86 is best accomplished by a high tension spring steel spring (not shown) located at pivot point 84. In summary, when piston 36 is in retracted position as illustrated in FIG. 5A, seat valve 86 is being urged outward and upward against lip 102 and rear wall of piston 36. When piston 36 is extended as illustrated in FIG. 5B, spring-loaded telescoping slide 82 and seat valve 86 move toward seat opening 18. Spring-loaded telescoping slide 82 guides seat valve 86 to seat opening 18 by urging catch 90 against lip 102 on the rear of piston 36.

In FIG. 5B waste collection system 10 is being "flushed" to remove fecal matter 20, wipes and cleaning material. This is done by either crank 16 (manually operated) or motor 50 (illustrated in FIG. 4). In FIG. 5B occlusion valve plate orifices 66 are beginning to close as seat valve 86 approaches seat opening 18. This closing will force out of plate orifices 66 any fecal matter 20 or other material stuck therein.

Figure 5C:
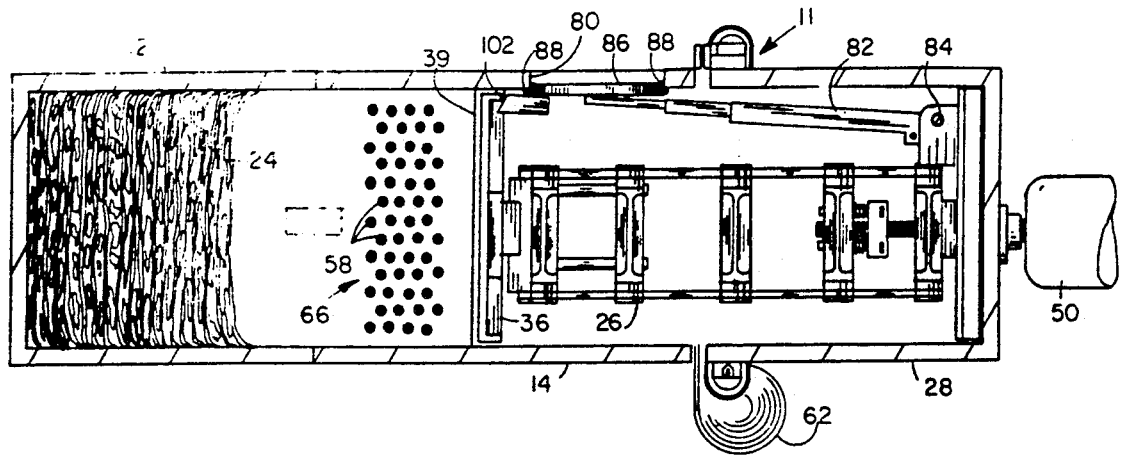

In FIG. 5C, the "flushing" continues as piston 36 has passed seat opening 18 and seat valve 86 has sealed against seat opening 18. That is, telescoping slide 82 has reached its furthest extension under urging of an internal spring (not shown). As piston scissors 26 continue to extend, lip 102 draws away from catch 90. Because of the wedge-shaped design of catch 90, combined with upward urging against lip 102, seat valve 86 will be guided into place, covering seat opening 18. Seat valve seals 88 on seat valve 86 are pressed against seat opening lip 80. When passing this position of "seat sealing," occlusion valve plate orifices 66 are shut by the insertion of tightly fitting occlusion valve stems 158 therein, in a manner that will force the solid particles, if any, that are stuck in plate orifices 66 out into path of sweeping piston 36, thereby cleaning out occlusion valve 44. FIG. 5C further illustrates the manner in which piston 36 sweeps across waste collection area 14 while covered by a sheet 39 with ends of sheet 39 overlapping edge of piston face 64. Sheet 39 thereby acts as a swab on the inside surface of body 11 to clean it of any fecal matter 20 or other material. Sheet 39 has an impervious layer facing piston 36 for preventing soiling of piston 36. Facing waste collection area 14 are multiple layers of paper or other absorbent material. With occlusion valve stems 158 protruding just slightly past inside wall of body 11, any fecal matter 20 or other material will be cleaned off by the passage of piston 36 as illustrated in FIG. 5B. In the storage position seat valve 86 seals seat opening 18 in body 11.

Figure 5D:
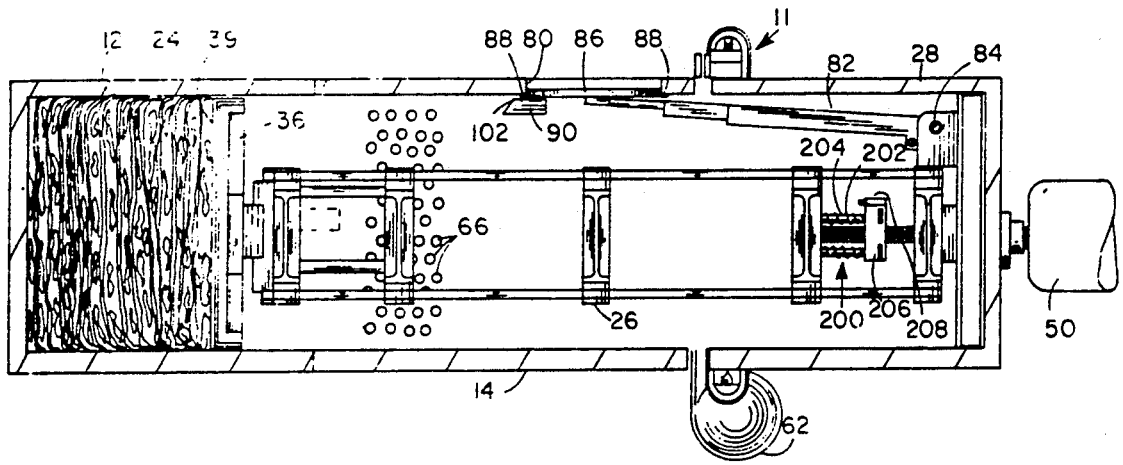

FIG. 5D illustrates waste collection system 10 in a "stored" configuration. Fecal matter 20, wipes and cleaning material is spread between sheet 39 under pressure exerted by piston 36. Seat valve 86 has sealed seat opening 18 to prevent the escape of odor and bateria therefrom. Occlusion plate orifices 66 are closed. In this configuration the cavity within body 11 is under slight negative pressure from vacuum tap 76 (not shown). This negative pressure will also prevent any gas buildup from bacterial action in soiled sheets 24. Such bacterial action will be minimized by using bacteriostatic agents in sheet roll 62. Catch 90 holds seat valve 86 flush with exterior body 11, catch 90 acting as a stop thereon.

Figure 5E:
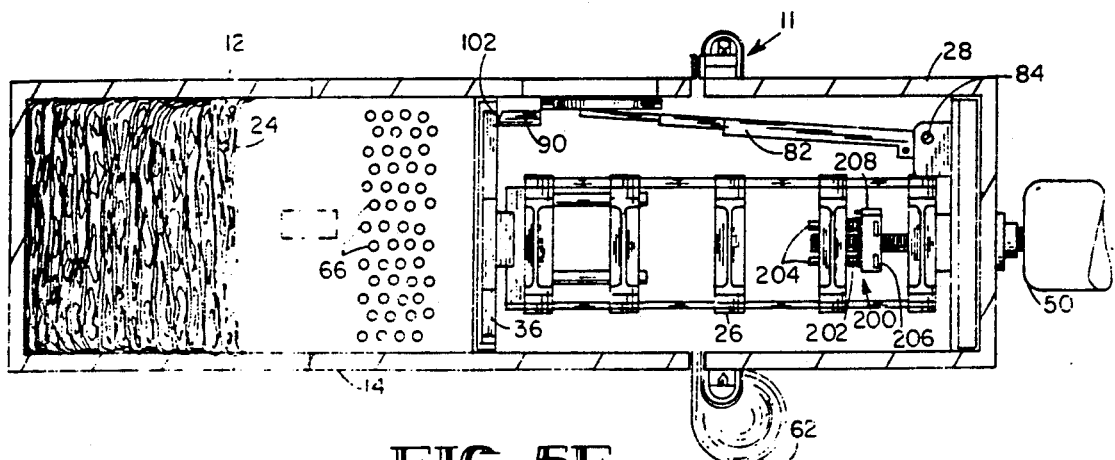

FIG. 5E illustrates piston 36 being retracted ("re-armed") in preparation for use of waste collection system 10 by user. As piston 36 retracts metal, rubber or other flexible material is utilized as a flap valve mechanism (not shown) on the rear of piston face 64 to open and relieve negative pressure created when piston 36 is retracted. That is, without this pressure relief flap (not shown), piston 36, when drawn from position as illustrated in FIG. 5D to position as illustrated in FIG. 5E, will pull soiled sheets 24 back under the negative pressure created by piston 36 withdrawal. When piston 36 is retracted to a position past sheet feed mechanism 40, the user is ready to replenish piston face 64 with new sheet 39 and waste collection system 10 will be ready to use again. In this manner waste collection system 10 repeats cycles of collection and compression, thereby storing fecal matter 20, wipes and cleaning material deposited in waste collection area 14.

An alternate embodiment for closing seat opening 18 with seat valve 86 utilizes telescoping slides 82 that are not spring loaded. Instead, catch 90 consists of two flexible prongs in the shape of a "V" when viewed from above seat valve 86. Those two prongs are connected at their apex on the underside of seat valve 86 in the same location as catch 90 as illustrated in FIGS. 5A-5E. However, in this alternate embodiment, a post extends vertically downward from lip 102. The two prongs are shaped to "pop" over the post, and are held thereby to piston 36 while piston 36 is extended. When telescoping slides 82 reach their outer limit, continued extension by piston 36 "pops" post from between prongs of catch 90. Seat valve 86 then slides upward into place in the manner described in the preferred embodiment.

FIGS. 5D and 5E also illustrate the means by which piston face 39 maintains constant pressure on soiled sheets 24 when system 10 is "stored." Continuous compression means 200 consists of helical spring 202 wound around the outside of spring guide 204. When piston scissors 26 are extending, spring block 206 compresses helical spring 202 to force piston 36 outward. When soiled sheets 24 are contacted by piston 36, helical spring 202 compresses, and extension of piston 36 ceases. Limit switch 208 will shut off motorized operation when helical spring 202 is compressed, and piston scissors 26 are extended. Helical spring 202, being compressed, keeps pressure on piston scissors 26 and piston 36 thereby. In this manner, constant compression means 200 keeps pressure on soiled sheets 24 when piston 36 is in stored position.

Figure 5F:
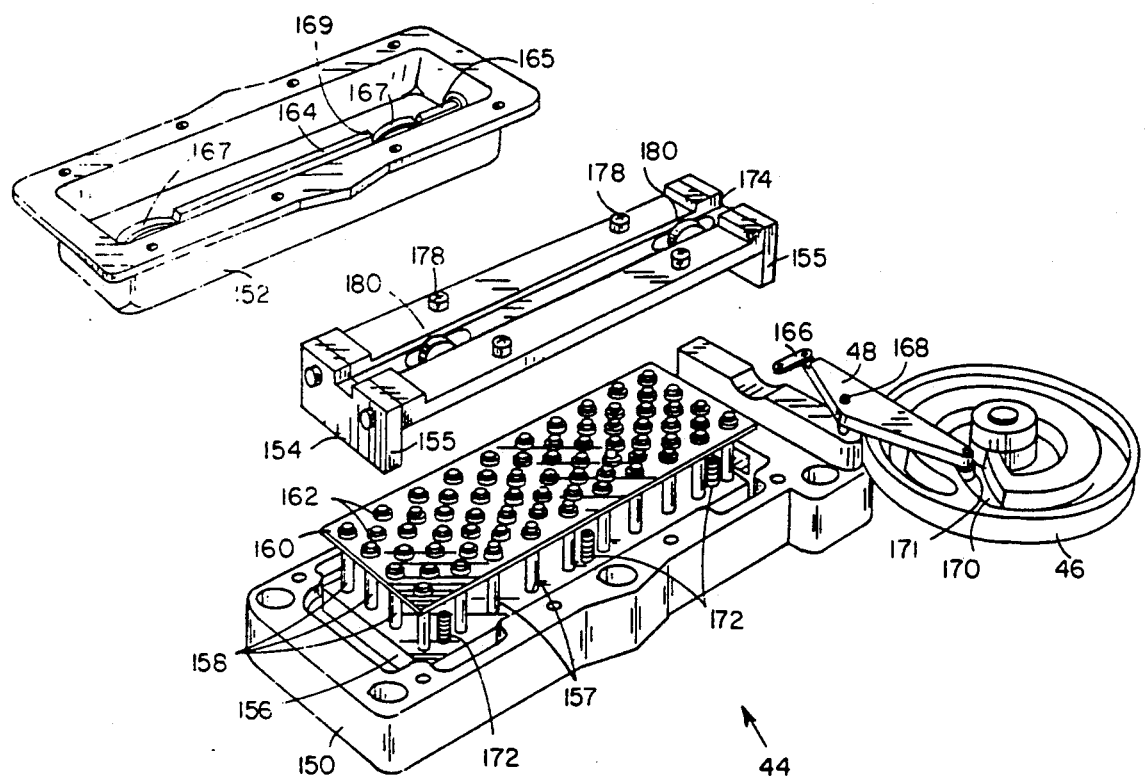
FIG. 5F is an exploded perspective of the occlusion valve of the present invention.

FIG. 5F is an exploded view of occlusion valve 44. Occlusion valve frame 150 is generally rectangular with the inner perimeter notched to conform to the dimensions of valve guide plate 156. Valve guide plate 156 contains numerous valve guide openings 157 therethrough, of sufficient dimensions to guide the passage of generally cylindrical occlusion valve stems 158. That is, valve guide plate 156 is a solid, generally tabular-shaped plate shaped to fit within a notch on the inside perimeter of occlusion valve frame 150. A plurality of cylindrical valve guides 157 perforate valve guide 156. Valve guide openings 157 are of sufficient dimension to allow valve stems 158 to slidably pass therethrough. One end of valve stems 158 is sized to fit tightly within occlusion valve plate orifices 66 (as shown in FIGS. 5B and 5C above). A second end of valve stems 158 is received through valve stem retainer plate 160 with circular valve stem retainer clips 162 bracketing valve stem retainer plate 160 so as to hold end of valve stem 158 to valve stem retainer plate 160. Actuator plate 154 overlays valve stem retainer plate 160, with actuator plate guides 155 depending downward over actuator stem retainer plate 160 and into a notch in occlusion valve frame 150. Adjustor screws 178 in actuator plate 154 can be adjusted to control height of actuator plate 154 above valve stem retainer plate 160. Actuator plate 154 has a reciprocation rod channel 174 thereon, and at least two actuator plate rollers 180 centered on longitudinal axis of reciprocation rod channel 174. Actuator plate rollers 180 do not contact valve stem retainer plate 160 when actuator plate 154 lays thereon. Rather, adjustor screws 178 are the points of contact between actuator plate 154 and valve stem retainer plate 160. Rotation of adjuster screws 178 raises and lowers actuator plate 154. When actuator plate 154 is raised with respect to valve stem retainer plate 160, operation of reciprocation rod 164 urges valve stems 158 further into occlusion plate orifices 66. Reversing adjuster screws 178 brings actuator plate 154 closer to valve stem retainer plate 160. Operation of reciprocation rod 164 thereafter will urge valve stems 158 into and out of occlusion plate orifices 66.

Cover 152 contains a cavity of sufficient dimensions to cover actuator plate and valve stems 158 when cover 152 is affixed to valve frame 150. Within valve cover 152 and along the longitudinal axis thereof lies reciprocation rod 164 riding on reciprocation rod bearing surface 165. That is, reciprocation rod bearing surface 165 is the surface of a hole through cover 152 along which reciprocation rod 164 slides during operation of occlusion valve 44. Reciprocation rod 164 is affixed to rocker arm-reciprocation rod link 166 at a first end. Movement of rocker arm 48 causes a back and forth movement of reciprocation rod 164 riding on reciprocation rod bearing surface 165. Reciprocation rod 164 is shaped generally as illustrated in FIG. 5F with a curved portion 167 and a roller stop portion 169.

To operate occlusion valve 44, cam 46 is rotated through cam drive (not shown) which is coupled to conventional gears at end of cam drive shaft 45 (shown in FIG. 3). Rotation of crank 16 is thereby translated to rotation of cam 46. When cam 46 begins to rotate, rocker arm 48 moves accordingly. Cam roller 171 is attached to one end of rocker arm 48, and rides along channel of cam guide 170. As cam 46 rotates, movement of rocker arm 48 about rocker arm pivot pin 168 is translated to reciprocation rod 164 through rocker arm-reciprocation rod link 166. In this manner rocker arm 48, pivoting about rocker arm pivot pin 168, translates motion at the end of rocker arm 48 riding in cam guide 170 to motion at the opposite end of rocker arm 48 which contains rocker arm-reciprocation rod link 166. Thus, reciprocation rod 164 moves back and forth in response to urging by cam 46.

During operation of occlusion valve 44, curved portion 167 of reciprocation rod 164 overrides actuator plate rollers 180, and forces actuator plate 154 against valve stem retainer plate 160, which in turn urges tightly fitting valve stems 158 to protrude into occlusion valve plate orifices 66 (as shown in FIGS. 5B and 5C). Occlusion valve 44 is timed to close and clean out occlusion valve plate orifices 66 with valve stems 158 in the manner described with FIGS. 5A–E above. It should be noted that cam 46 rotation must be geared down between rotation of crank 16 and rotation of cam 46. This can be done in a conventional manner utilizing worm gears (not shown) with the appropriate gear ratios allowing multiple rotations of crank 16 to translate into a single rotation of cam 46.

FIGS. 6, 7, 7A, 7B, and 7C all illustrate the manner in which the sheet feed mechanism 40 is constructed and operates to replenish piston face 64 with sheet 39 from sheet roll 62. Basically, the replenishing is a five-step process. First, jaws 97 and 99 of grabber bar 98 grip paper at fingers 112' of gripper bar 112. Second, grabber bar 98, holding sheet 39, moves upward (see FIG. 6) across face 64 of piston 36. Third, as grabber bar 98 clears piston 36, trip mechanism 118 (see FIG. 7) releases retractable jaw 97 from stationary jar 99 and frees sheet 39 held therebetween. Fourth, blade 113 cuts sheet 39 from sheet roll 62. The piston sheet now has a fresh sheet 39 covering face 64 of piston 36 and is ready for a "flushing" cycle. The final step occurs after "flushing" and "rearming" when grabber bar 98 with jaws 97 and 99 open moves down across face 64 of piston 36. Tripper mechanism 118 is activated by adjustable trip 124 and spring 101 slams jaw 97 shut on sheet roll 63 held between fingers 112' of gripper bar 112. The sheet replenishing cycle is then again ready to begin. A more detailed explanation of the process is set out in the following paragraphs and FIGS. 6, 7, 7A, 7B, 7C, and 8.

Sheet feed mechanism 40 is designed to grab material from sheet roll 62 by means of grabber bar 98, which consists of retractable jaw 97 and stationary jaw 99. Sheet 39 is thus held tightly between jaws 97 and 99 of grabber bar 98. Subsequently, grabber bar 98 is drawn upward across piston face 64 by means of sheet feed chain 104 on which grabber bar support member 136 and grabber bar 98 is mounted. Grabber bar 98 is guided by feed gap 144 and sheet feed chain 104 as it is carried upward to a position just clearing inside wall of body 11. As grabber bar support member 136 approaches roller 116, elbow 121 of trip mechanism 118 contacts roller 116 and is depressed, thereby opening retractable jaw 97. Sheet feed motor 108 drives sheet feed chain 104 through drive shaft 103 and sprockets (not shown).

The final step in replenishing sheet 39 is for the user to actuate cutter blade 113. Cutter blade 113 rides on blade support member 117, which is attached to cutter blade chain 114. Cutter blade chain 114 is driven by cutter blade motor 119. When not in use cutter blade 113 is stored outside and away from gripper bars 112. Gripper bar 112 is constructed of blades 111 and 115 close enough together to allow sheet roll 62 to slide freely through, yet at the same time exerting enough pressure so that during and subsequent to the cutting process, sheet roll 62 remains firmly between blades 111, 115. During cutting operation, cutter blade 113 moves across sheet roll 62 just above gripper bar 112.

Cutter blade 113 is generally circular with a sharpened perimeter and rotates about cutter blade articulation pin 123 during cutting operation. Sheet roll 62 is pressed between anvil 91 and cutter blade 113 and is thereby cut through. Cutter blade 113, guided by chain guide 141, will pass across and back in one cutting cycle where appropriate electrical switching will cause cutter blade chain 114 to reverse its direction when cutter blade 113 has moved across sheet roll 62. In this manner cutter blade 113 moves across and back, severing sheet roll 62 and providing a fresh sheet 39 for piston 36 (not shown).

An alternate embodiment of a structure by which sheet 39 can be severed from sheet roll 62 comprises a fixed, sharp, cutting bar against which a cutter roller (in place of cutter blade 113) presses sheet 39. That is, a "rolling anvil" is utilized to sever the paper by pressure against a sharp, fixed blade surface.

Figure 7A:
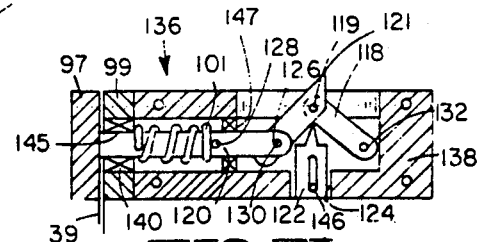
FIGS. 7A–7C are elevated cross-sections showing the trip mechanism of the sheet feeding assembly.
Figure 7B:
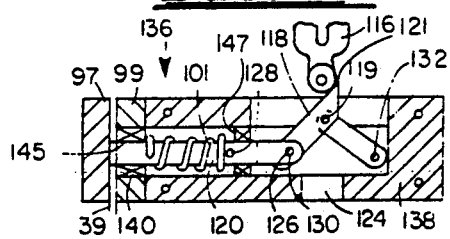
Figure 7:
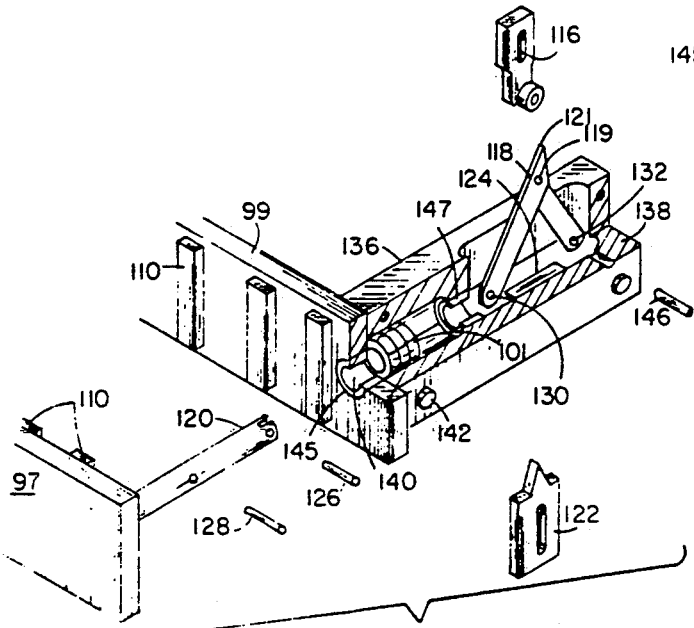
FIG. 7 is an exploded perspective of the grabber bar portion of the sheet feeding assembly.
Figure 7C:
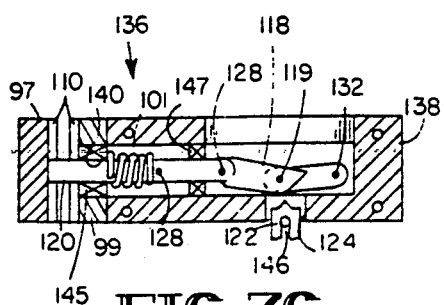

FIGS. 7, 7A, 7B, and 7C more fully illustrate the manner in which grabber bar 98 and trip mechanism 118 are constructed and operate. Compressible pads 110 are mated to the inside faces of both retractable jaw 97 and stationary jaw 99 in a manner such that, when jaws 97, 99 are together, each compressible pad 110 contacts a mate on the other jaw. Compressible pads 110 are spaced such that when grabber bar 98 is replenishing sheet 39, compressible pads 110 fit into gaps between fingers 112' of gripper bar 112. Between the gripper bar fingers 112' are held sheet roll 62. As grabber bar 98 with jaws 97, 99 open is moving downward across retracted piston 36 in order to replace sheet 39, jaws 97, 99 are open. This position is shown in FIG. 7C. As jaws 97, 99 approach adjustable trip 122, adjustable trip 122 slides through trip slot 124 and forces trip mechanism 118 to pivot at elbow pivot point 119 as illustrated in FIG. 7A. Spring 101 urges jaw guide 120 and retractable jaw 97 to slam shut to a closed position against stationary jaw 99. When retractable jaw 97 slams shut on stationary jaw 99, having been tripped by adjustable trip 122, grabber bar 98 is positioned over gripper bar fingers 112'. That is, when retractable jaw 97 slams shut, compressible pads 110 will grab sheet roll 62 that is being held between fingers 112' of gripper bar 112. When this step is completed, user reverses paper feed motor 108 to move grabber bar 98 up across face 64 of piston 36, grabber bar 98 now containing sheet 39 firmly between jaws 97 and 99. As grabber bar 98 approaches its upper limit, roller 116 contacts trip mechanism 118 at elbow 121 and urges jaw guide 120 outward and thereby opens retractable jaw 97 and releases sheet 39. Paper feed motor 108 is automatically switched off by a limit switch (not shown). FIG. 7C shows trip mechanism 118 as it locks jaws 97 and 99 in an open position and thereby releases sheet 39. Spring 101 is compressed between pin 128 and guide bearing 145.

FIGS. 7, 7A and 7B illustrate how jaw guide 120 is guided along guide channel 140, riding on bearing surfaces 145, 147. That is, as grabber bar 98 is tripped from an open position as illustrated in FIG. 7C to a closed position as illustrated in FIG. 7A, jaw guide 120 rides along bearing surfaces 145 and 147. Helical spring 101 urges and maintains retractable jaw 97 in a shut position until opened by roller 116. Grabber bar support member 136 is permanently attached to rear of stationary jaw 98 as illustrated in FIG. 7; facing 138 is adapted to attach with bolts 142 to grabber bar support member 136 so as to allow access to spring 101, trip mechanism 118, and jaw guide 120. Pins 146, 126, and 128 act to hold trip mechanism 118 together. That is, pin 146 holds pivoting member of trip mechanism 118 securely in place. Pin 126 holds jaw guide 120 to movable end of trip mechanism 118. Pin 128 in jaw guide 120 acts as a stop against helical spring 101.

Figure 8:
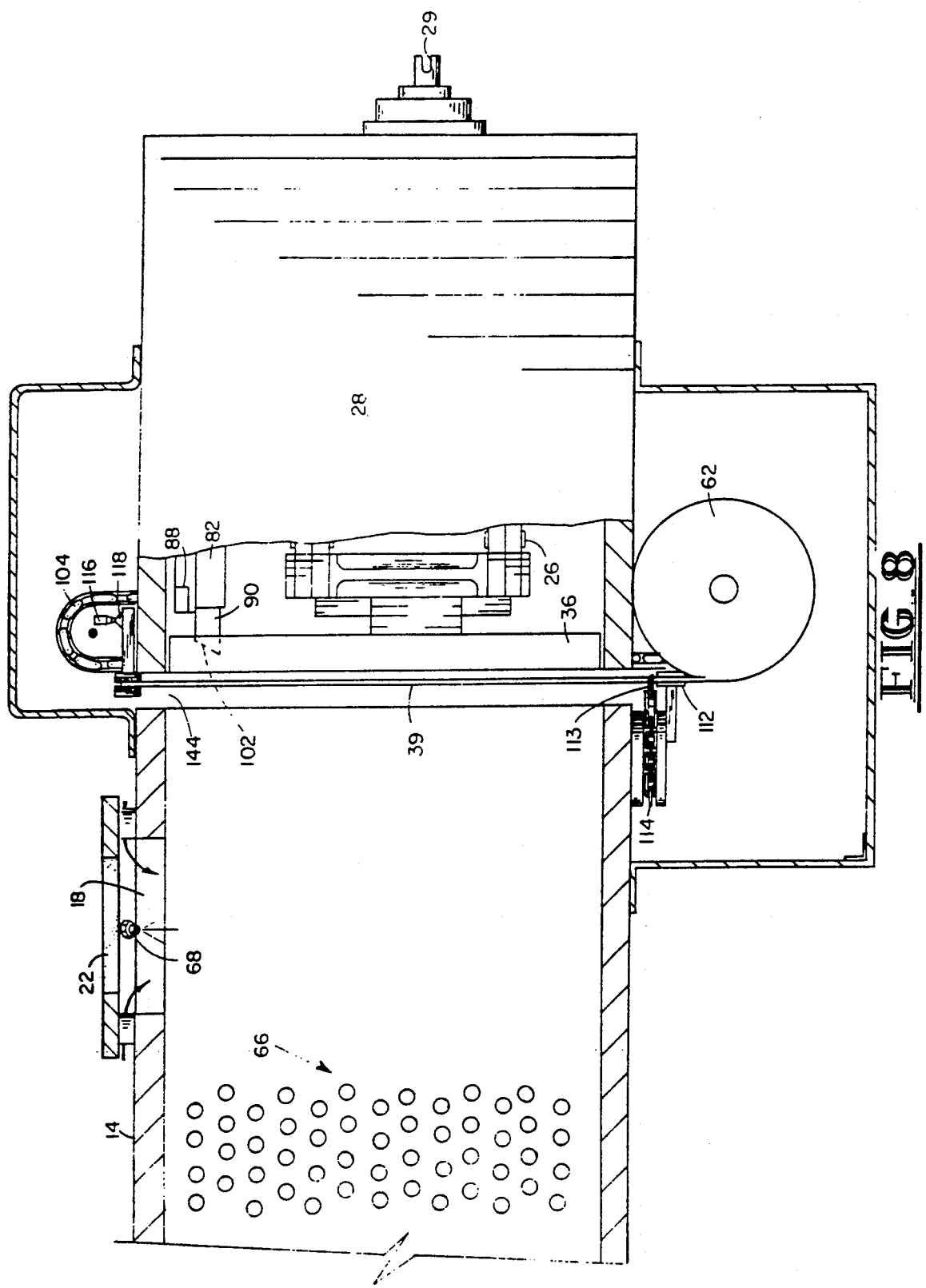
FIG. 8 is an elevated cross-section of the sheet feeding assembly.

FIG. 8 further illustrates the manner in which the sheet feed mechanism 40 operates to replenish piston face 64 of piston 36 with fresh paper sheet 39. In FIG. 8 grabber bar 98 is shown as it approaches its uppermost limit with elbow 121 (see FIG. 7) of trip mechanism 118 contacting roller 116. At this point retractable jaw 97 of grabber bar 98 begins to disengage stationary jaw 99 and release paper sheet 39. Feed gap 144 acts as a track for grabber bar 98 and is of sufficient dimensions for grabber bar 98 to pass therethrough when jaws 97 and 99 are open. Cutting blade 113 is positioned to begin cutting cycle. In FIG. 8 it is seen how cutting blade chain 114 guides cutting blade 113 across sheet roll 62. Following cutting, grabber bar 98, with jaws 97 and 99 open, will retract down to straddle gripper bar 112, and slam shut in the manner described in the preceding paragraphs. Thus, it can be seen from FIGS. 6, 7, 7A, 7B, 7C and 8 how the sheet feed mechanism 40 of waste collection system 10 replenishes paper sheet 39 on piston face 64 of piston 36 just prior to the commencement of each "flushing" cycle.

FIGS. 9, 10, and 11 illustrate the preferred embodiment with the waste storage area 12 removable from rest of body 11. The inside of waste collection area 12 is lined with a flexible bag insert 190 (much like a garbage can liner) as illustrated in FIG. 9 or rigid container 194 shaped to conform to the interior dimensions of waste collection area 12 as illustrated in FIG. 11. FIG. 10 shows waste collection area 12 without any type of removable insert. In FIGS. 9 and 11 the removable inserts 190 or 194 allow the occupants of the space craft to periodically remove accumulated soiled sheets 24 (not shown) from waste collection area 12. Bag insert 190 can be tied by tie 196 upon removal to prevent odor from escaping. User would then re-line interior of waste collection area 12 with fresh insert bag 190. Rigid container insert 194 may be sealed with an appropriate lid, in a manner much like Tupperware containers are used to store leftovers. Latch mechanism 196 is designed to pull flange 192 close against body 11. Gasket 198 on flange 192 made of an appropriate flexible material such as rubber, would insure a good seal against body 11.

FIGS. 12 and 13 illustrate jets 68 with nozzle 69 along perimeter of seat 22. Jets 68 may be adjusted to change direction of air flow therefrom. Nozzle 69 may be rotated and thus control the amount of air flowing therethrough, in the same fashion as the nozzle of a garden hose may be rotated to adjust the flow of water therethrough. Not illustrated is an air pump which may be adapted and connected to jets 68 so that user may manually switch air pumps on to increase the flow of air through jets 68 beyond the flow created by the low pressure within body 11. That is, there is an overdrive that will send compressed air through jets 68 by manual operation of an air pump. The purpose for this is to allow more efficient separation of the bolus from the rectal area of the user.

It is understood that other structures may be suggested by the claims. The purpose of the above description is to illustrate the preferred claims and is not intended as a limitation upon the claims. While a particular embodiment of a waste collection system 10 for zero gravity environments has been illustrated and described, it will be obvious that changes and modifications can be made without departing from the spirit of the invention or the disclosure hereinabove and the scope of the appended claims.

I claim:

1. A device for feeding a sheet onto a piston face, comprising:

a grabber bar which is generally elongated and includes a first jaw and a second jaw, said first and second jaws being generally opposed to open and close on said sheet to secure and release said sheet thereby;

a track having said grabber bar mounted thereon, said track alternately moving said grabber bar in a first direction across said piston face, to a first terminus above said piston face and, subsequently reversing said first direction and moving said grabber bar in a second direction to a second terminus below said piston face;

a gripper bar having a first plate and a second plate, said first and second plates being generally identically shaped and having fingers extending therefrom, said first and second plates being demountably coupled, said gripper bar applying pressure great enough to hold said sheet sandwiched therebetween, yet weak enough to allow said sheet to slidably move therebetween, said gripper bar being located at said second terminus;

trip means alternately urging said jaws of said grabber bar to an open position from a closed position, releasing said sheet thereby when said grabber reaches said first terminus, and back to a closed position securing said sheet therebetween, when said grabber bar reaches said second terminus;

cutting means for severing said sheet from a sheet source at a point just above said gripper bar when said first and said second jaws are at said first terminus;

a hollow mounting member integral with said grabber bar having a first and a second end and a channel therethrough, said mounting member fixedly attached at said first end to said track and at said second end to said first jaw; and a guide member with a first and a second end, said guide member sized to slidably fit within said channel in said mounting member and attached at said first end to said second jaw and at said second end to said trip means, wherein said trip means urges said first and second jaws alternately from said open position to said closed position.

2. The device as described in claim 1, said track further comprising a chain, a drive sprocket, and a non-drive sprocket, said drive sprocket located at said first terminus, said non-drive sprocket located at said second terminus, and a motor means attached to said drive sprocket for rotating said drive sprocket and urging said chain with said grabber bar thereattached along said track.

3. The device as described in claim 1, said trip means further comprising: a pivoting member made up of a first arm and a second arm, a helical spring with a first and a second end, a compression means, and a release means, said first arm rotatably mounted to said mounting member at a first end by a first articulation pin and rotatably mounted at a second end to a first end of said second arm by a second articulation pin, said second end of said second arm being rotatably mounted to said guide by a third articulation pin, said helical spring enclosing said guide and contacting said guide at said first end through a stop pin attached to said guide and contacting said mounting member at said second end of said helical spring through a stop bearing located therein, said compression means located at said first terminus, and said release means located at said second terminus, wherein said pivoting member, in a generally straight alignment with said first and second arm generally aligned along a longitudinal axis of said guide, is compressing said spring and holding said jaws in said open position, until contact with said release means located at said second terminus, said release means urging said pivoting member from said straight alignment to a jointed alignment by urging said pivoting member at said second articulation pin in a direction generally normal to said axis of said straight alignment, said tripping drawing said jaws into said closed position, said jointed alignment being maintained by urging of said spring until said track reaches said first terminus whereupon said compression means contacts and urges said pivot member from said jointed alignment back to said straight alignment, thus in this manner alternately urging jaws from said closed position to said open position.

4. A device for feeding a sheet onto a piston face, comprising:

a grabber bar which is generally elongated and includes a first jaw and a second jaw, said first and second jaws being generally opposed to open and close on said sheet to secure and release said sheet thereby;

a track having said grabber bar mounted thereon, said track alternately moving said grabber bar in a first direction across said piston face, to a first terminus above said piston face and, subsequently reversing said first direction and moving said grabber bar in a second direction to a second terminus below said piston face;

a gripper bar having a first plate and a second plate, said first and second plates being generally identically shaped and having fingers extending therefrom, said first and second plates being demountably coupled, said gripper bar applying pressure great enough to hold said sheet sandwiched therebetween, yet weak enough to allow said sheet to slidably move therebetween, said gripper bar being located at said second terminus;

trip means alternately urging said jaws of said grabber bar to an open position from a closed position, releasing said sheet thereby when said grabber reaches said first terminus, and back to a closed position securing said sheet therebetween, when said grabber bar reaches said second terminus;

cutting means for severing said sheet from a sheet source at a point just above said gripper bar when said first and said second jaws are at said first terminus; and a plurality of mated resilient pads mounted on said jaws for holding said sheet therebetween, wherein each of said resilient pads on said first jaw has a mate of identical dimensions oppositely mounted on said second jaw, said mated pads separated from adjacent mated pads by a space of sufficient dimensions to allow said fingers of said gripper bar to pass therethrough when said first and second jaws are in said closed position and said mated pads hold said sheet therebetween.

* * * * *